United States Patent
McQueen et al.

(10) Patent No.: US 7,407,096 B2
(45) Date of Patent: Aug. 5, 2008

(54) SYSTEM AND METHOD FOR TRAINING AND MONITORING DATA READER OPERATORS

(75) Inventors: Alexander M. McQueen, Eugene, OR (US); Craig D. Cherry, Eugene, OR (US); David L. Latimer, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 105 days.

(21) Appl. No.: 11/003,743

(22) Filed: Dec. 2, 2004

(65) Prior Publication Data
US 2005/0092834 A1    May 5, 2005

Related U.S. Application Data

(63) Continuation of application No. 09/976,839, filed on Oct. 12, 2001, now Pat. No. 6,857,567.

(60) Provisional application No. 60/241,300, filed on Oct. 17, 2000.

(51) Int. Cl.
*G06K 15/00*     (2006.01)

(52) U.S. Cl. .................. 235/383; 235/462.01; 235/375; 235/462.27; 235/439; 235/462.15; 705/11; 705/14

(58) Field of Classification Search ................ 235/383, 235/462.01, 375, 462.27, 438, 462.15; 705/11, 705/14
See application file for complete search history.

(56) References Cited

U.S. PATENT DOCUMENTS

| | | | |
|---|---|---|---|
| 3,675,204 A | 7/1972 | Miehle et al. | 340/147 R |
| 4,260,979 A * | 4/1981 | Smith | 382/313 |
| 4,413,277 A | 11/1983 | Murray | 358/93 |
| 4,953,664 A | 9/1990 | Vrooman et al. | 186/59 |

(Continued)

FOREIGN PATENT DOCUMENTS

GB    2306025    4/1997

(Continued)

OTHER PUBLICATIONS

Grant, et al., *Monitoring Service Workers via Computer: The Effect on Employees, Productivity, and Service*, National Productivity Review, vol. 8, No. 2 (Spring 1989), need month.

*Primary Examiner*—Michael G. Lee
*Assistant Examiner*—Allyson N Trail
(74) *Attorney, Agent, or Firm*—Stoel Rives LLP

(57) ABSTRACT

A scanner or other data reader is equipped with means for determining characteristics of an operator's scanning technique. In a preferred configuration, the scanner is integrated with a weigh scale for obtaining a dynamic weight of an item as the item is moved across the weigh scale. Weight data produced by the scanning/weighing process includes information about the amount of lifting the operator performs on scanned items, the rate of scanning by the operator, and rescanning information. The scanner may be connected to a PC-based training system which uses the scanning technique information to provide feedback to the operator indicating the effectiveness of the operator's scanning technique, and may also provide information to management for analysis. The technique information may be collected by a store controller or other suitable collection device for later analysis and reporting.

22 Claims, 7 Drawing Sheets

U.S. PATENT DOCUMENTS

| | | | |
|---|---|---|---|
| 5,140,141 A | 8/1992 | Inagaki et al. | 235/462 |
| 5,172,313 A | 12/1992 | Schumacher | 364/401 |
| 5,212,635 A | 5/1993 | Ferriter | 364/402 |
| 5,231,293 A | 7/1993 | Longacre, Jr. | 250/568 |
| 5,239,460 A | 8/1993 | LaRoche | 364/401 |
| 5,334,825 A | 8/1994 | Maddox | 235/437 |
| 5,444,226 A | 8/1995 | Collins, Jr. | 235/462 |
| RE35,117 E | 12/1995 | Rando et al. | 235/375 |
| 5,623,404 A | 4/1997 | Collins et al. | 395/209 |
| 5,633,488 A | 5/1997 | Spitz | 235/462.27 |
| 5,684,964 A | 11/1997 | Powers et al. | 395/211 |
| 5,825,010 A | 10/1998 | Charych et al. | 235/472 |
| 5,826,240 A | 10/1998 | Brockman et al. | 705/11 |
| 5,837,983 A | 11/1998 | Actis et al. | 235/437 |
| 5,856,660 A | 1/1999 | Bard et al. | 235/462 |
| 5,864,616 A | 1/1999 | Hartmeier | 379/265 |
| 5,914,474 A | 6/1999 | Spitz | 235/438 |
| 5,939,697 A | 8/1999 | Spitz | 235/462.15 |
| 5,956,695 A | 9/1999 | Carrithers et al. | 705/14 |
| 5,967,264 A | 10/1999 | Lutz et al. | 188/61 |
| 5,980,429 A | 11/1999 | Nashner | 482/8 |
| 5,992,570 A * | 11/1999 | Walter et al. | 186/36 |
| 6,016,135 A | 1/2000 | Biss et al. | 345/126 |
| 6,047,261 A | 4/2000 | Siefert | 705/11 |
| 6,047,889 A | 4/2000 | Williams et al. | 235/383 |
| 6,049,779 A | 4/2000 | Berkson | 705/14 |
| 6,069,696 A | 5/2000 | McQueen et al. | 356/326 |
| 6,189,784 B1 | 2/2001 | Williams et al. | 235/375 |
| 6,206,288 B1 | 3/2001 | May et al. | 235/462.11 |
| 6,215,078 B1 | 4/2001 | Torres et al. | 177/25.15 |
| 6,342,830 B1 * | 1/2002 | Want et al. | 340/10.1 |
| 6,363,484 B1 | 3/2002 | Cordery et al. | 713/182 |
| 6,394,351 B1 | 5/2002 | Keys et al. | 235/462.01 |
| 6,394,355 B1 | 5/2002 | Schlieffers et al. | 235/472.01 |
| 6,446,208 B1 * | 9/2002 | Gujar et al. | 713/185 |
| 6,454,168 B1 | 9/2002 | Brandt et al. | 235/462.12 |
| 6,497,366 B1 | 12/2002 | Burkey et al. | 235/462.25 |
| 6,543,693 B1 * | 4/2003 | Stern et al. | 235/462.35 |
| 6,567,787 B1 | 5/2003 | Walker et al. | 705/16 |
| 6,719,202 B1 | 4/2004 | Kawai et al. | 235/462.13 |
| 6,726,094 B1 * | 4/2004 | Rantze et al. | 235/379 |
| 6,792,394 B1 | 9/2004 | Matsko et al. | 702/187 |
| 6,813,609 B2 * | 11/2004 | Wilson | 705/14 |
| 6,871,185 B2 | 3/2005 | Walker et al. | 705/16 |
| 6,871,195 B2 | 3/2005 | Ryan et al. | 706/46 |
| 7,222,086 B2 | 5/2007 | Huffman | 705/11 |
| 2001/0038038 A1 * | 11/2001 | Rando et al. | 235/462.45 |
| 2002/0016739 A1 * | 2/2002 | Ogasawara | 705/22 |
| 2002/0074402 A1 | 6/2002 | Latimer et al. | 235/454 |
| 2002/0178048 A1 | 11/2002 | Huffman | 705/11 |
| 2004/0217175 A1 * | 11/2004 | Bobba et al. | 235/462.39 |
| 2005/0038695 A1 | 2/2005 | Matsko | 705/10 |
| 2005/0133600 A1 * | 6/2005 | Lucera et al. | 235/462.25 |

FOREIGN PATENT DOCUMENTS

| | | |
|---|---|---|
| JP | 2000-172948 | 6/2000 |
| WO | WO9746856 | 12/1997 |
| WO | WO 02/27571 A2 | 4/2002 |

* cited by examiner

DIRECTION OF SCANNING
(PREFERRED) →

DIRECTION OF SCANNING
(PREFERRED) →

1

SYSTEM AND METHOD FOR TRAINING AND MONITORING DATA READER OPERATORS

RELATED APPLICATIONS

This application is a continuation of application Ser. No. 09/976,839 filed Oct. 12, 2001, which claims priority to provisional application Ser. No. 60/241,300 filed Oct. 17, 2000, each of these applications being hereby incorporated by reference.

BACKGROUND

The field of the present invention relates to data reading systems, such as barcode scanners, and methods for operating such systems.

Typically, fixed scanners are installed in a retail checkstand environment for scanning items. Customers gather items for purchase and transport their items to the checkstand. Items are either (1) placed on a counter, with the operator scanning the items; (2) brought to the operator in a basket, whereby the operator takes the items directly from the basket and scans them; or (3) placed on a conveyor system which transports the items to the operator, whereby the operator scans the items. The items are either scanned by moving them through (or presenting them to) the scan field of a fixed scanner or, in the case of a handheld scanner, the operator aims the scanner at the barcode and scans it.

In order to maximize throughput speed and minimize physical stress, operators may receive training on scanner operation. Further, the operator may become familiar with the operation of the scanner by trial and error, for example, by adjusting the distance an item is spaced from the scan window during scanning to provide the most consistent first-time reads. Existing systems may also include a monitoring system for measuring the scanning rate of the operator.

SUMMARY

The present invention is directed to a system and method for training and monitoring a data reader operator. The system comprises a data reader for gathering information about an operator's scanning technique, a PC-based training device that receives the information from the data reader for the purpose of training the operator, and a point-of-sale (POS) device that receives the information for the purpose of monitoring operator scanning technique during normal use. In a preferred embodiment, the data reader may be integrated with a weigh scale for obtaining a dynamic weight of an item as the item is moved across the weigh scale. Weight data produced by the scanning/weighing process includes information about the amount of lifting the operator performs on scanned items, the rate of scanning by the operator, and rescanning information. The system provides feedback to the operator indicating the effectiveness of the operator's scanning technique, and may also provide information to store management for analysis. As a result, the system assists the operator in using the data reader in a more ergonomic and/or efficient manner.

In another embodiment, the data reader is equipped with a visual feedback display positioned on the data reader housing in a high-visibility location. The feedback display provides a visual readout (i.e. the feedback) in a graphical format indicating, for example, the effectiveness of the operator's scanning technique.

DETAILED DESCRIPTION OF PREFERRED EMBODIMENTS

The preferred embodiments will now be described with reference to the drawings. To facilitate description, element numerals designating an element in one figure will represent the same element in any other figure.

A data reader, as defined herein, is primarily described as a barcode laser scanner in which a laser beam is scanned to produce one or more scan lines for reading a barcode. The data reader may alternately comprise any suitable data reading device such as a CCD imaging data reader, LED reader, CMOS imaging reader, RFID reader, EAS deactivation device, or the like. Other types of reading devices may include security devices such as X-ray or metal detector machines such as those used in airport and building entry security. Though the following examples will generally be described with respect to typical barcode scanners used in the retail environment, it will be understood that the disclosed systems and methods may be applied to any suitable reading devices wherein an operator moves, or "scans," an item through the read volume of the data reading device.

Figure 1:
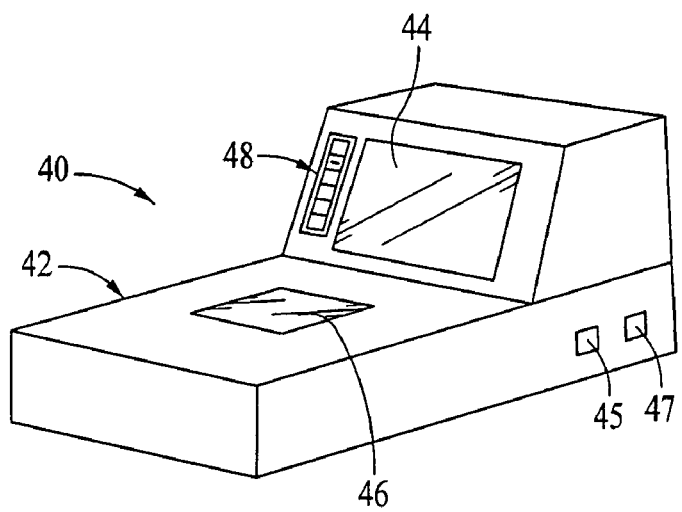
FIG. 1 is a diagrammatic perspective view of a fixed scanner/scale according to a first embodiment.

FIG. 1 illustrates a multi-window scanner 40 similar in configuration to the Magellan® scanner-scale manufactured by PSC Scanning, Inc. of Eugene, Oreg. The scanner 40 includes a housing 42 having an upper housing section containing a vertical window 44 and a lower housing section containing a weigh platter 41 and a horizontal window 46. A feedback display 48 may be positioned on the housing 42 at a high-visibility location relative to an operator, illustrated on the upper housing section next to the vertical window 44. The feedback display 48 is described in greater detail below.

The scanner 40 has a field of view out through scanner windows 44, 46. The scanner 40 projects a scan pattern comprising one or more scan lines out through the windows 44, 46 for reading barcodes presented or passed through the scan volume. The scanner may read 1-D or 2-D optical codes, product identification, fingerprint ID, or other items such as might be required to be scanned in a retail environment or in security applications.

In another embodiment, a Radio Frequency Identification (RFID) reading device may be used to activate and collect data from RFID tags placed on items. An RFID tag is a normally passive device, but when activated or prompted by a signal from an interrogator, the RFID tag emits a signal with its information to a receiving device. The process of scanning RFID-tagged items is essentially identical to that of scanning barcoded items. In both cases, the item with a tag bearing the information to be captured is brought near or scanned past a compatible reading device to obtain data relating to the item.

The scanner 40 may also be equipped with Electronic Article Surveillance (EAS) equipment, which may be integrated with the scanner 40 or placed in the immediate vicinity thereof. EAS tags are placed on items for the purpose of theft prevention. At the time of purchase, the EAS tag on an item is deactivated so that it will not trigger detection devices placed at store exits. The deactivation equipment is preferably in very close proximity to or integrated with the scanner 40, and is used as part of the overall scanning process. In a typical form, the deactivation equipment is triggered by a "good read" signal from the scanner 40.

Figure 2:
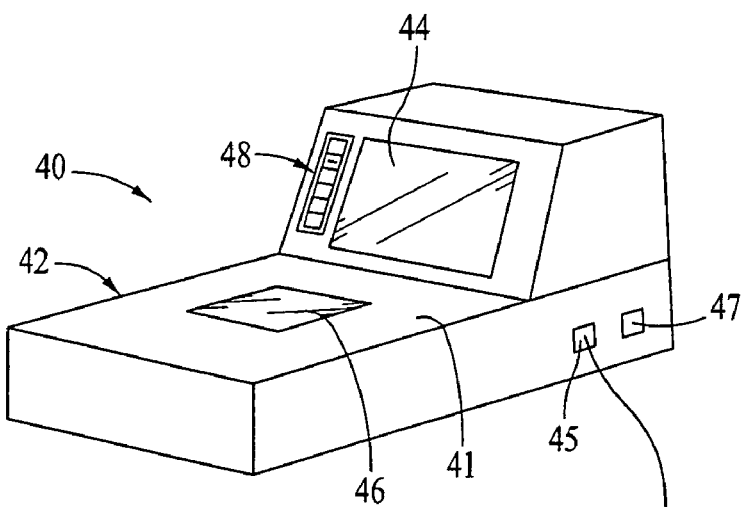
FIG. 2 is a diagrammatic perspective view of the fixed scanner of FIG. 1 connected to a PC for implementing a training mode.
Figure 2:
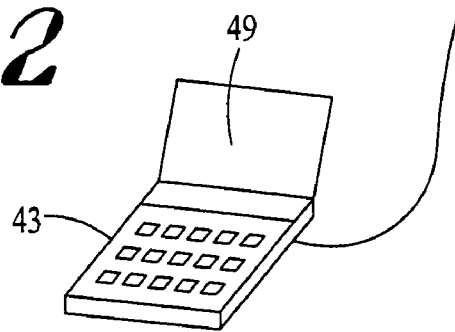

The scanner 40 is provided with a "training mode" in which a special set of items, encoded with identified data, are used to gather information about the operator's scanning technique. Training occurs via a software application based in a personal computer (PC) 43, as shown in FIG. 2, which communicates with the scanner 40 via connection to a PC-port 45 on the scanner housing 42.

The software application utilizes scanning technique information received from the scanner 40 to evaluate the effectiveness of an operator's scanning technique. The application may also display scanning instructions on a video monitor 49 of the PC 43, including animations and videos of proper scanning techniques, and may also broadcast audio descriptions/instructions. The instructions are preferably tailored to an individual operator based upon data received from the scanner 40 after the operator has scanned a certain number of specific items.

The application running on the PC 43 may provide information and reports about scanning techniques to the operator, as well as to store management, along with suggestions for technique improvements. The scanner 40 in the training mode may be located in a customary POS checkstand, or may be located in a special training area away from the usual transactional setting.

Figure 3:
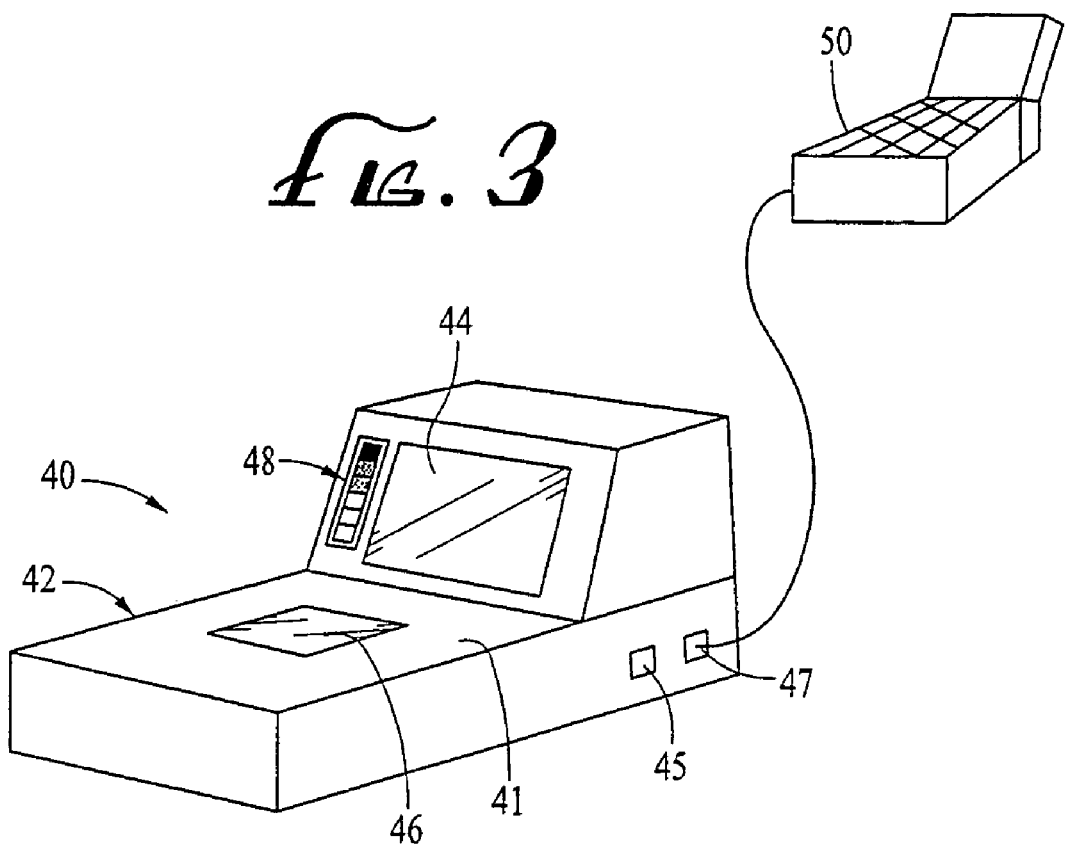
FIG. 3 is a diagrammatic perspective view of the fixed scanner of FIG. 1 connected to a POS terminal for implementing a monitor mode.

In another embodiment, hereinafter referred to as the "monitor mode," the scanner 40 continuously monitors the scanning technique of an operator based upon items scanned that are purchased by customers. In this embodiment, the scanner 40 is used in its normal configuration in a checkstand with connection to a POS system 50 via a POS port 47, as shown in FIG. 3. The scanner 40 provides scanning technique information to the POS system 50, which may then provide the information to a central system location for management evaluation.

In order to measure the scanning technique of the operator, the scanner 40 first determines one or more of the following barcode orientation/movement data: which scanner window the barcode data came from which scan line or lines were used to read the barcode; distance of the barcode from the scanner; how long the barcoded item was present in the scan volume before complete decoding occurred (i.e., how long the bar code was present in the scan volume after initial detection by the scanner before a complete barcode scan occurred); or how many pieces of barcode data were assembled to decode the data. From this data, inferences about the operator's scanning technique can be formed, and feedback can then be supplied to the operator and/or to store management.

The scanner 40 may also be used to instruct operators on the proper use of EAS equipment. The EAS deactivation process is not 100% reliable, partly due to poor operator scanning technique. If, for example, the operator is too quick in moving the product through the deactivation zone, the EAS tag may remain active. The failure of an EAS tag to deactivate has serious consequences. A customer may be stopped by alarms at a store exit, inconvenienced, embarrassed, or even falsely accused of theft.

The problem of scanner operators failing to properly deactivate EAS tags may be minimized by teaching operators proper scanning technique. Accordingly, the training mode described above may further be used to instruct operators on the proper use of EAS equipment. In this embodiment, the identified training items include items having EAS tags which are used for deactivation practice. The EAS deactivation system preferably includes means, such as a sensing antenna, to determine if an active EAS tag is present. Thus, after a training run, an operator may pass the scanned items back across the EAS sensing antenna to determine how many items are still active, and thus, how many items were not properly deactivated.

The EAS system may also sense how long an EAS tag is present in the deactivation volume during the training run, and thereby determine the approximate speed at which an item was moved through the deactivation volume. Based upon this measurement, the system could provide feedback to the operator on how to improve item movement technique.

In another embodiment, the training items may be outfitted with non-deactivatable EAS tags. Accordingly, the entrance to and exit from the deactivation volume, as well as the amount of time an item remains in the deactivation volume, may be measured by the active tag sensing means. This item presence and time data, coinciding with when the operator attempts to read the item data with the scanner 40, may be used for determining scanning technique effectiveness.

In a preferred embodiment, a weigh scale having a weigh platter 41 is integrated with the scanner 40 to determine the amount of lifting performed by a scanner operator. An important aspect of proper ergonomic technique during scanning is the minimization of lifting. Thus, providing feedback relating to the amount of lifting performed is beneficial to the physical well being of the operator.

The weigh platter 41 is used for weighing items priced by weight and for obtaining the "dynamic weight" of items. The dynamic weight of an item is the weight registered by the weigh platter 41 as the item is moved across the surface of the weigh platter 41 during scanning. When an operator scans a heavy item, he/she preferably slides the item through the scan zone, rather than lifting the item. As an item is dragged across the weigh platter, the item is in contact with the weigh platter for a period of time as it is moved.

For a particular item, this motion may be analyzed to determine a preferred dragging motion, and from that analysis, to obtain an optimum partial weight value or an optimum dynamic weight output (the output may actually be a preferred weight operation function) to ascertain a preferred weight operation function for that item. The optimum partial weight or optimum dynamic weight of the item may then be stored in a lookup table for future comparison during scanning, and/or may be sent to the POS terminal as additional data along with the normal barcode data.

The lookup table preferably contains weight data for commonly purchased items which are either heavy or are the type of items that are more likely to require manipulation by the operator, that is, items which are most likely to lead to higher exertion or repetitive motion injuries. The lookup table may reside in the scanner 40 or in the training application. When an operator scans such an item, the lookup table is accessed and item weight data or a preferred weight operation function obtained from the lookup table is compared to the dynamic weight or weight operation function of the item registered by the weigh platter 41. Feedback may then be displayed to the operator and/or store management, reflecting the closeness of the preferred weight to the scan weight, or closeness to an optimum dragging motion in one or more of the forms described above.

If the dynamic weight closely approximates the partial weight or the optimum dynamic weight of the item, this feedback indicates that the weigh platter 41 is bearing most of the load and that the operator is practicing proper scanning technique. If, on the other hand, the dynamic weight differs substantially from the weight expected for the item, this feedback indicates that the weigh platter 41 is likely not bearing the bulk of the load and that the operator is performing unnecessary lifting that could lead to repetitive motion injuries.

In an alternative embodiment, the scanner may compute the average dynamic weight of items scanned over an extended period of time, such as the duration of a scanner operator's work shift. The average dynamic weight may then be sent to the POS terminal upon receipt of a suitable command, where it may be compared to an average weight standard to determine whether the operator is likely to be performing more lifting than is recommended. The average weight standard reflects an expected average weight that is obtained when many items are scanned over an extended period of time. The average weight standard may be established through trial and error, through evaluating several operators over a period of time who utilize proper scanning technique, or through some other suitable method. Feedback may then be provided to the operator reflecting the closeness of the average weight standard to the average dynamic weight of the scanned items, in one or more of the forms described above. The average dynamic weight that is sent to a POS terminal or other data collection system may also be used for the purpose of reporting the average dynamic weight to store management for analysis.

Various other types of information about scanning technique may be obtained from weight data obtained from the weigh platter 41. When an item is moved across the weigh platter 41, a weight pulse is produced signifying the duration of time that the item is present on the weigh platter 41. Inferences may be made about stress on the operator's body based upon the weight of the item and how fast the item is moved across the weigh platter 41 (heavier items should be moved more slowly). Thus, when a heavy item is moved quickly across the weigh platter 41, the weight pulse produced will be relatively short, indicating that the operator is moving the heavy item too quickly through the scan zone, which could lead to repetitive motion injuries.

Additionally, ease of scanning, and the occurrence of rescanning, may be determined by the time within the weight pulse at which a good read of an item occurs. When an item is scanned easily, the good read will occur, on average, near the middle of the weight pulse. If, on the other hand, a good read does not occur as the item is initially moved across the weigh platter 41, a rescan is required. Rescanning is the process wherein the item enters the scan volume of the scanner at a typical scanning speed, a good read does not occur initially, and the item must therefore be moved around on the weigh platter 41 in an attempt to obtain a good read. Once a good read is obtained, the item is moved off of the weigh platter 41 fairly quickly. Thus, the good read occurs near the end of the weight pulse, since the item remained on the weigh platter 41 for a relatively long period of time before the good read occurred, and the item was then quickly removed from the weigh platter 41. This rescanning occurrence information may be provided as feedback to the operator for the purpose of improving scanning technique, and may also be sent to a POS terminal or other data collection system for analysis by store management.

In monitoring lifting in monitor mode, dynamic weight of each item may be sent to the store system along with the customary item identification data. By statistical analysis of dynamic weight and scan technique data per operator, inferences about training effectiveness may be obtained.

The same ergonomic considerations that apply to scanning barcoded items apply to scanning RFID-tagged items as well. With RFID scanning, however, the need to twist and rotate items to read data is eliminated, because the RFID tag sends out an omni-directional signal, which is read by the RFID reading device regardless of the orientation of the item and the RFID tag. Accordingly, determining which scanner window reads the RFID information is irrelevant to determining proper scanning technique. The tendency of operators to lift items improperly is still present, however, and the same dynamic weight data used in barcode scanning may be used when monitoring RFID scanning. Thus, a weigh scale device may be used in conjunction with an RFID reader to obtain operator lifting data in a manner similar to that used with a barcode scanner/scale.

Figure 4:
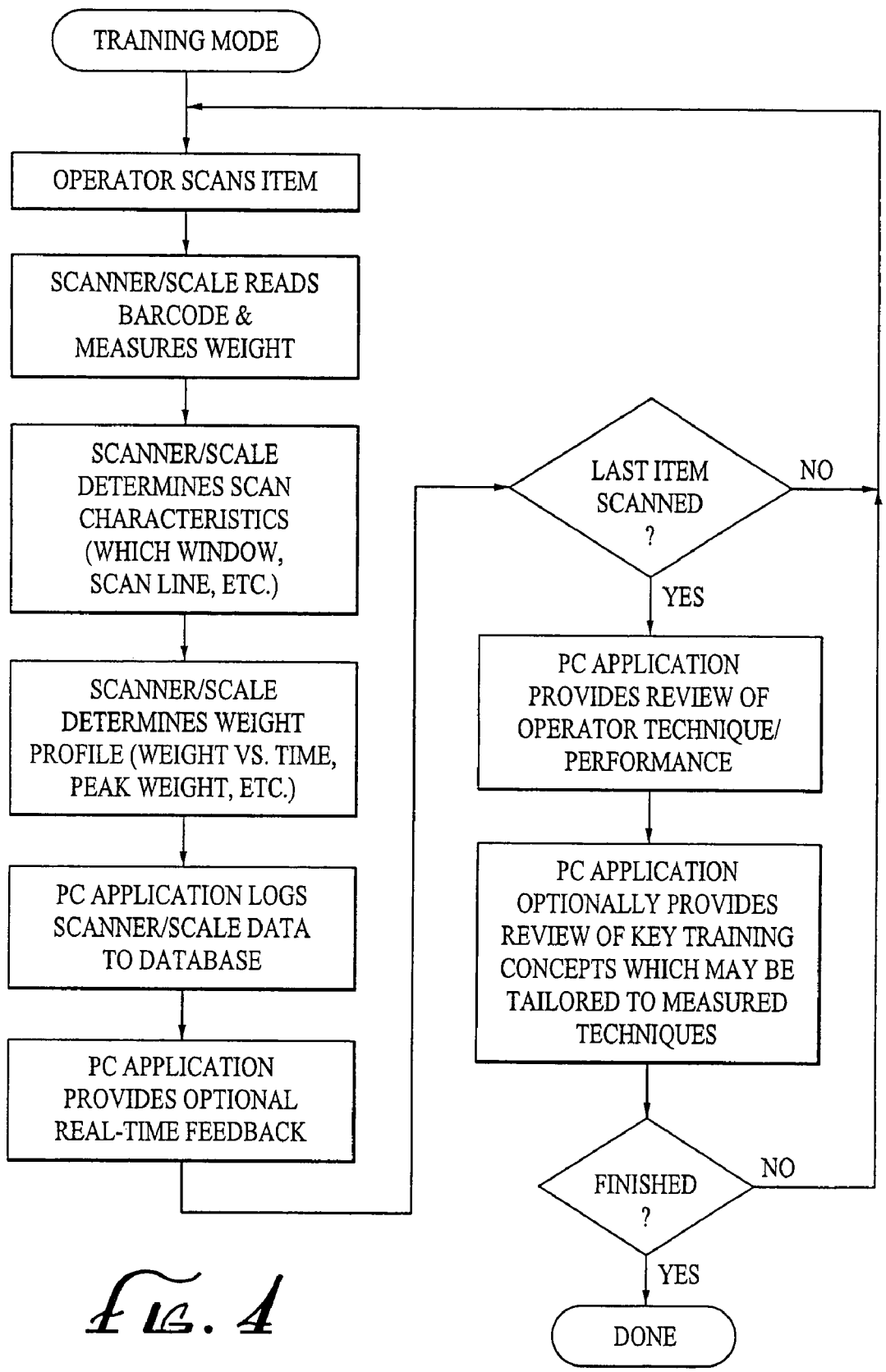
FIG. 4 is a flowchart illustrating the steps followed in the training mode of FIG. 2.
Figure 5:
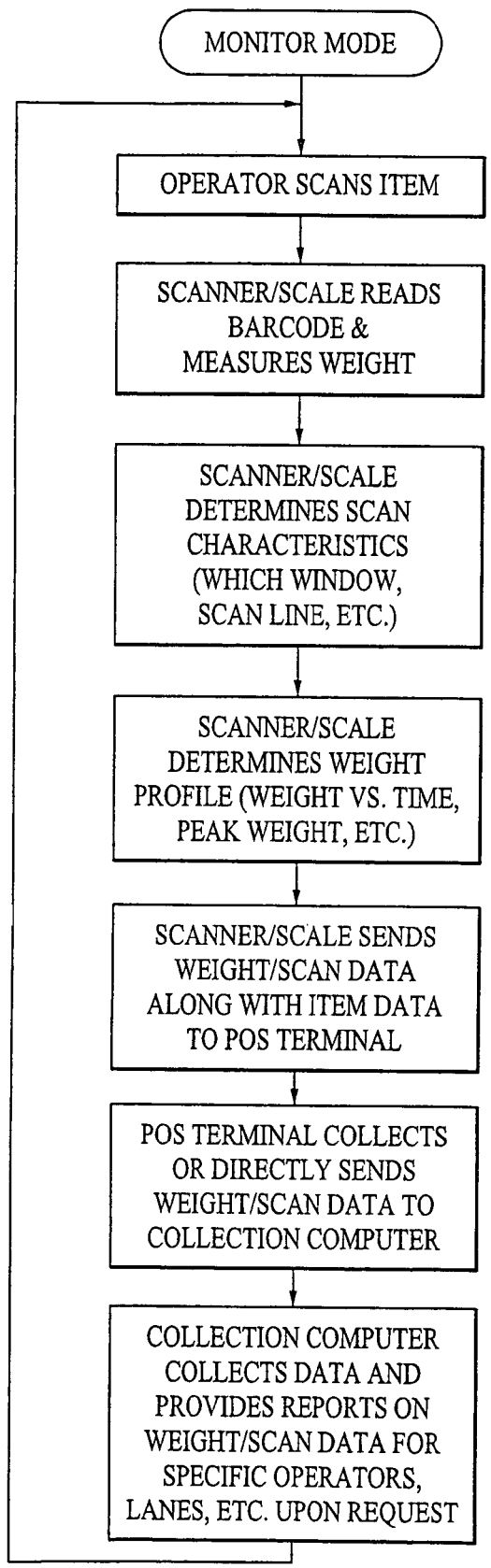
FIG. 5 is a flowchart illustrating the steps followed in the monitor mode of FIG. 3.

FIGS. 4 and 5 are flowcharts illustrating the training and monitor modes, respectively. In both modes, an operator passes an item through the scan volume of the scanner 40 so that the scanner 40 reads a barcode affixed to the item. Additionally, if the item is moved across the weigh platter 41, the weigh scale measures a dynamic weight of the item. The scanner 40 then determines the barcode orientation/movement data and the weight profile data, hereinafter referred to collectively as the scanner/scale data, as described above.

In the training mode illustrated by the flowchart of FIG. 4, the PC software application logs the scanner/scale data in a performance database for evaluation by management. The PC application may also provide real-time scanning technique feedback to the operator via the video monitor 49, or any other suitable means. This process continues until the last training item is scanned, after which, the PC application evaluates the operator's performance and provides a review of the operator's scanning technique to the operator and/or to the performance database. The review may include information describing flaws in the operator's scanning technique, suggestions on how to improve scanning technique, or any other suitable feedback data.

In the monitor mode of FIG. 5, the scanner 40 sends the scanner/scale data, along with the barcode item identification data, to the POS terminal 50. The POS terminal 50 collects or directly sends the scanner/scale data to a collection computer, which assembles the data and provides reports to store management. The reports may include scanning technique data for specific operators, or specific checkout lanes, or for any other relevant criteria requested by management.

Figure 6:
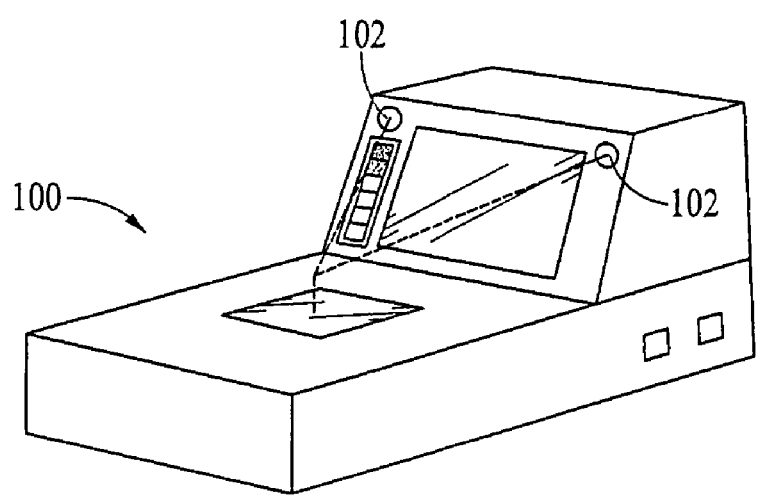
FIG. 6 is a diagrammatic perspective view of a scanning system employing cameras for detecting scan motion.

In another embodiment, actual scan motion is monitored to evaluate an operator's scanning technique. FIG. 6 illustrates a system 100 with one or more cameras 102 or sensors which detect motion of items as the operator passes them through the scan volume. The signal from the cameras is sent to a processor, such as via a suitable machine vision program, which analyzes the motion of the item (or the operator's hands) to determine how the item was moved through the scan volume, i.e., if it was lifted rather than dragged, or if it was twisted, or how long the item was in the scan volume before a successful scan occurred.

The use of multiple cameras may be preferred to the use of a single camera, because multiple camera views may be triangulated with one another (as shown by the dashed lines in FIG. 6), thereby producing a more thorough depiction of an operator's scanning technique. Since the identity of the item is known once it is scanned, the motion detected may be compared to a preferred or typical motion from the lookup table and feedback may be provided to the operator on how efficiently the operator moved the item through the scan volume via one of the display systems described above.

Reports, reviews, and evaluations of operator scanning technique may be produced as hard copy reports from a printer and/or may be displayed on a video monitor, such as PC monitor 49. Additionally, real-time feedback may be provided to the operator in graphical form via the visual feedback display 48. The visual feedback display 48 may be incorporated into the scanner 40, as shown in FIG. 1, or may be incorporated into any other suitable scanning system.

Figure 7:
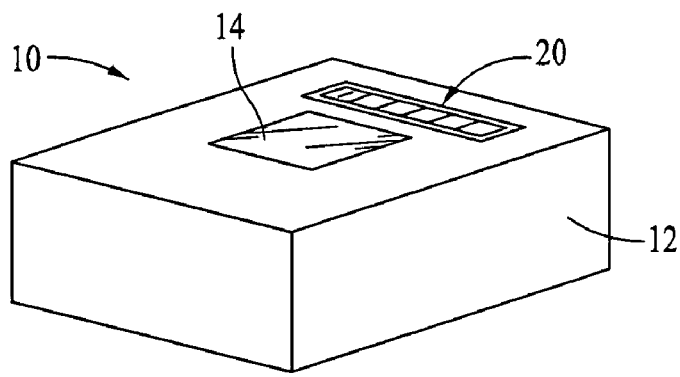
FIG. 7 is a diagrammatic perspective view of a scanner according to an alternative embodiment.
Figure 8:
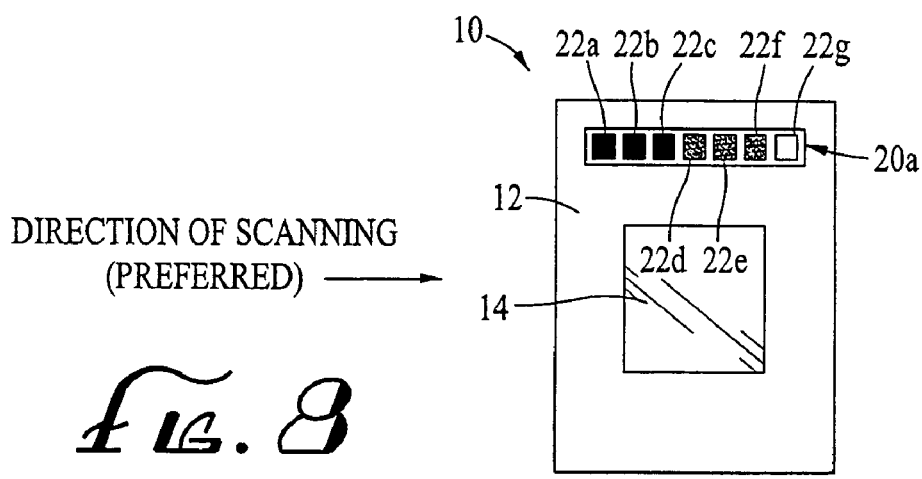
FIG. 8 is an illustration of a first operation mode of the scanner of FIG. 7.
Figure 9:
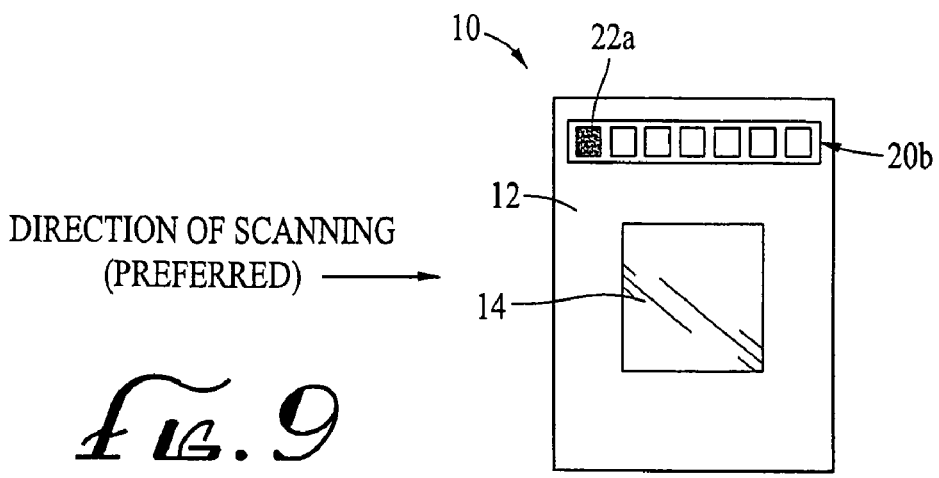
FIG. 9 is an illustration of a second operation mode of the scanner of FIG. 8.

FIGS. 7-9 illustrate a scanner 10 having a visual feedback display 20 that provides a visual readout (feedback) in a bar-graph format, in this instance, in an incremental format. The graphical display 20 includes a plurality of lamps 22a-22g which are lighted depending upon, for example, the effectiveness and/or efficiency of the operator's scanning technique, as described above. In the display 20a of FIG. 8, the bars 22g, 22f are fully lighted, the bars 22b, 22c, 22d, 22e are partially lighted, and the bar 22a is unlighted indicating that the scan technique was poor. In the display 20b of FIG. 9, all but bar 22a is fully lighted indicating that the scanning technique was good. The opposite methodology could also be followed, wherein the bars 22 could be lighted, in red for example, for a poor read, and not at all (or optionally in green) for a good read. Additionally, the lamps 22a-22g could light from left to right, as opposed to from right to left as shown.

The bars 22a-22g may light in a single color and intensity, or each bar may have a different color, or each bar may have the ability to change color thereby individually alighting in different colors. For example, bars 22g-22f may first light yellow, and then change to red if bars 22e-22d are also lighted.

The preferred color and graphical scheme is preferably one in which the feedback to the operator is highly intuitive. For example, via testing, it may be determined that a user intuitively associates the color green (green means "go") with successful reading operation. In that case if the system interprets a good operating technique, a green display may be initiated. If the system interprets a poor operating technique, a red display (red means "stop") may be initiated. Alternately, the display 20 may comprise a single bar changing colors, from green to red for example, to signify output value. Alternately, the display 20 may provide alphanumeric readout, e.g. displaying numbers 1 through 10, with higher numbers indicating a superior operation.

For a scanner with the indicators mounted on a horizontal surface thereof, the row of bars is preferably oriented parallel to the direction of, and not directly under, the path of scanned item flow so that neither the operator's hands nor the items scanned will obscure the display during scanning. For example, if the direction of scanning is from left to right, as illustrated in FIGS. 8-9, the operator is preferably positioned at the bottom of the scanner, and items are passed from left to right across the window 14.

In a preferred embodiment, the system provides feedback to the operator that assists the operator in using the scanner in a more ergonomic and/or efficient manner, as described above. The scanner display 20 provides information to the operator by visual and/or audible mechanisms.

Forms of visual feedback could be, for example, lamps of various colors or which are arranged in sequential rows (as in the "bar graph" type display), or a video display with graphical or textual information about the operator's scanning technique. Audible feedback may include special sounds which indicate how properly the operator is scanning. The normal "good read" tone may be adjusted in pitch, duration, or other characteristic to provide the feedback information.

The feedback may comprise audible tones that could vary in pitch and/or volume to provide specific feedback information to the operator. The audible system may be preferred in training because the visual aspect could be distracting. The scanner may be connected to a dedicated PC or controller for training purposes.

Figure 10:
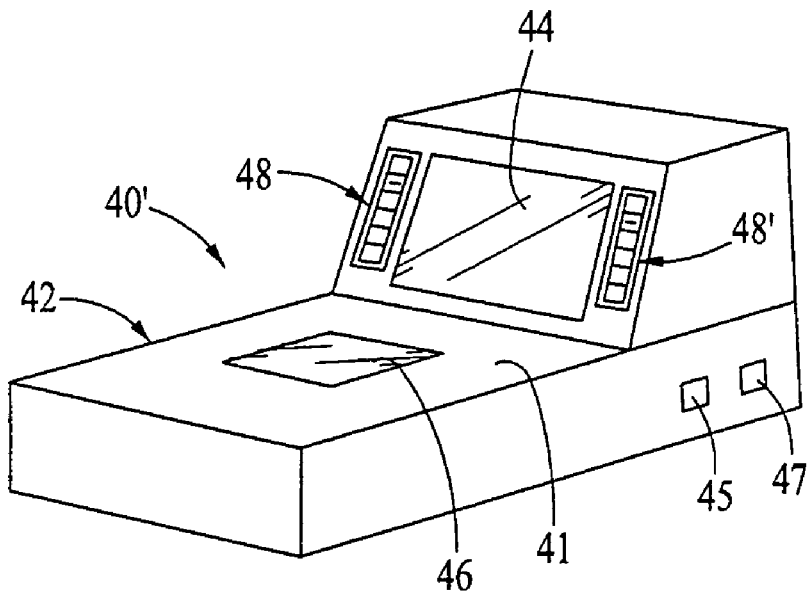
FIG. 10 is a diagrammatic perspective view of the fixed scanner of FIG. 1 employing two visual feedback displays.

In an alternative embodiment, as shown in FIG. 10, a scanner 40' integrated with a weigh platter 41 may include a second visual feedback display 48' for providing feedback relating to the operator's lifting technique separately from other scanning feedback data. The other scanning feedback data may then be provided via the first visual feedback display 48.

Figure 11:
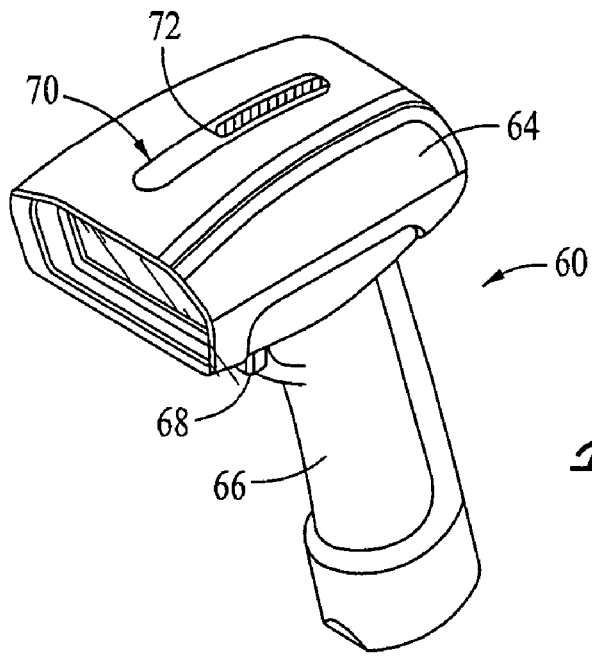
FIG. 11 is a diagrammatic, front left perspective view of a handheld scanner according to an alternative embodiment.
Figure 12:
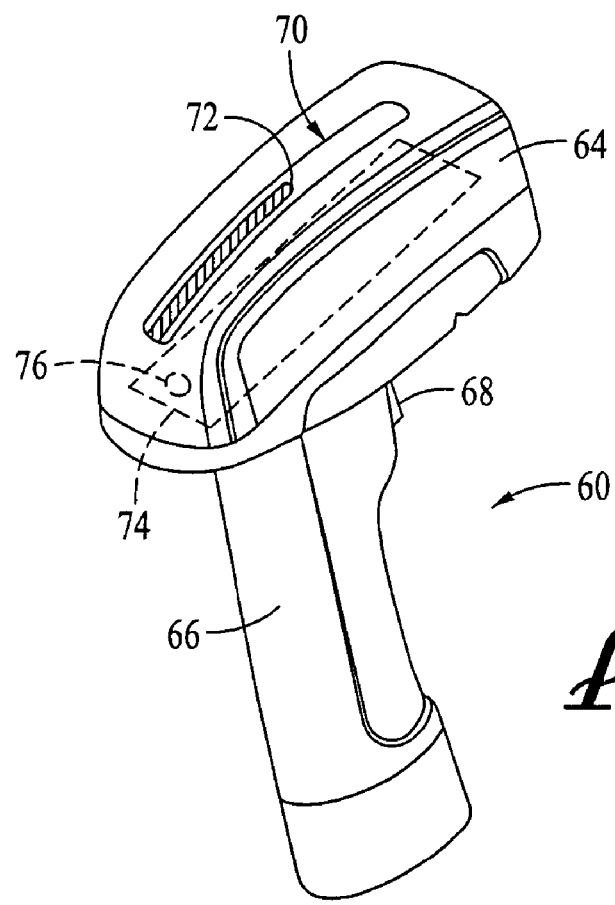
FIG. 12 is a diagrammatic, rear right perspective view of the handheld scanner of FIG. 11.

FIGS. 11-12 illustrate a handheld scanner 60 similar in configuration to the PowerScan™ scanner manufactured by PSC Scanning, Inc. of Eugene, Oreg. The scanner includes a housing comprised of a scan head section 64 and a handle section 66. A trigger 68 is positioned on the handle 66 for operation. A visual display 70 is positioned on the top of the scan head section 64. The display 70 includes a continuous bar graph indicator which can provide feedback to the operator such as previously described. Additionally in the handheld environment, the feedback could also relate to (a) distance to object being scanned; (b) excessive motion, i.e. operation technique is not sufficiently steady; (c) trigger operation; or (d) aiming operation. For example, the scanner may include a velocity sensor or an accelerometer 76, mounted to or integrated into the scanner PCB 74 (both shown schematically by dashed lines in FIG. 12), which monitors motion of the scanner. By analyzing motion of the scanner at or around the time that a barcode is read, excessive motion may be determined and appropriate feedback may be provided to the operator.

The display 70 may also be aligned along the trop of the scan head section 64 along the line of sight which provides for a highly visible location and may also serve to assist in aiming of the scanner 70.

Figure 13:
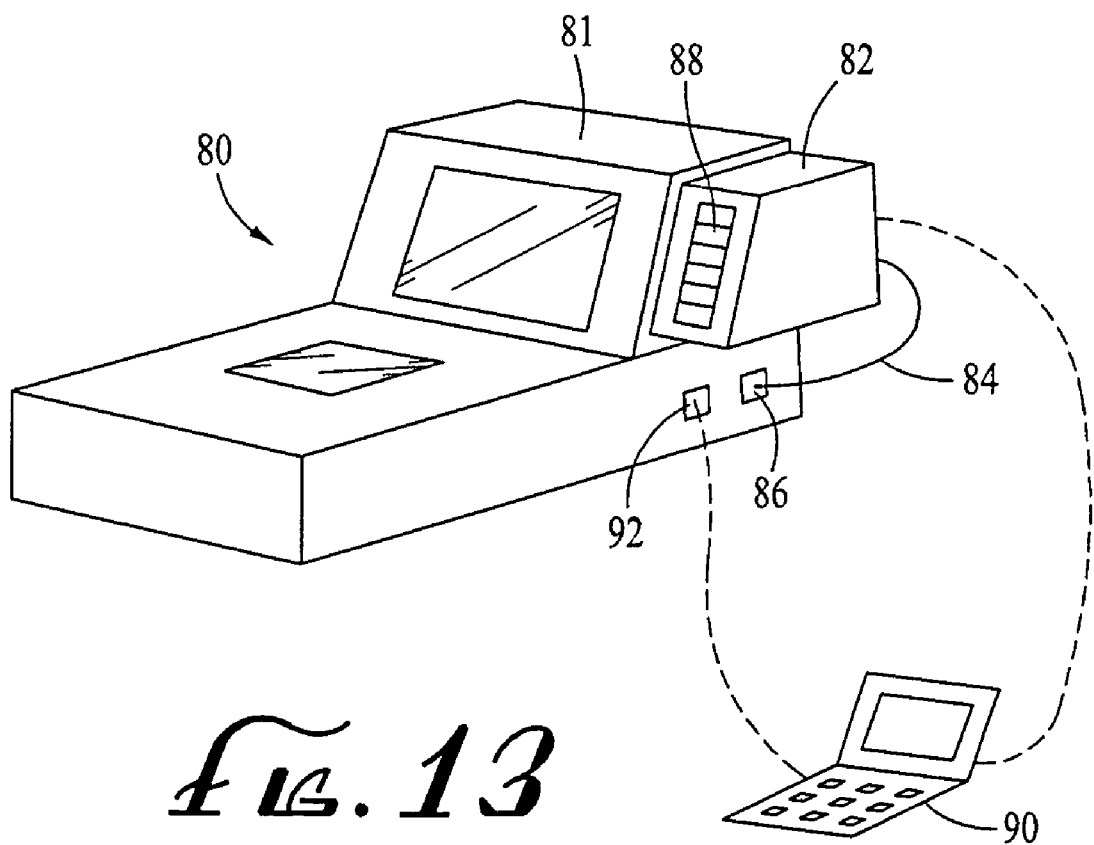
FIG. 13 is a diagrammatic perspective view of a scanner with a display module attached thereto.

The feedback system and graphical display may be incorporated into the scanner housing 80 itself, or it may comprise an add-on module 82, as shown in FIG. 13, mounted to the housing 81 of a scanner 80. In such a system, the module 82 may include a cord 84 which is connected to a port 86 on the scanner 80 for obtaining the scan and/or weight information for performing the analysis. The module 82 is removable and thus may be only temporarily connected to the scanner 80. The module 82 may comprise only the visual display 88, with processing being handled by a separate computer. For example, the module may be connected to a notebook computer 90, the computer 90 including suitable feedback analysis software. The notebook computer 90 is also connected to a port 92 on the scanner 80 for receiving the scanning and/or weight information.

Benefits of the various embodiments described herein may include one or more of the following: (a) improved operator productivity and scanning technique, (b) reduction in physical stress on the operator thus reducing repetitive motion injuries, (c) continuous improvement feedback, and (d) reports to management about operator technique.

Thus while embodiments and applications of the present invention have been shown and described, it would be apparent to one skilled in the art that other modifications are possible without departing from the inventive concepts herein. The invention, therefore, is not to be restricted except in the spirit of the claims that follow.

What is claimed is:

1. A data acquisition system comprising
a data reader for reading tags on items being moved through a read region;
a weigh scale, including a weigh platter, integrated with the data reader, the weigh platter being positioned generally below the read region, the weigh scale obtaining weight data of items placed on the weigh platter;
a processor for determining an effectiveness of a reading technique based upon a combination of input from the data reader and input of weight data from the weigh scale.

2. The data acquisition system of claim 1 further comprising a camera for monitoring motion of the item being moved through the read region.

3. The data acquisition system of claim 1 further comprising
feedback means in communication with the processor for providing feedback indicating the effectiveness of the reading technique.

4. The data acquisition system of claim 3 wherein the feedback means comprises a printer for printing a reading technique report.

5. The data acquisition system of claim 4 wherein the feedback means comprises a video monitor for displaying reading technique data.

6. The data acquisition system of claim 4 wherein the data reader includes a housing and wherein the feedback means comprises a visual feedback display located on the housing.

7. The data acquisition system of claim 4 wherein the feedback means comprises audible feedback.

8. The data acquisition system of claim 7 wherein the audible feedback includes a plurality of different sounds indicating how properly an operator is moving items through the read region.

9. A system for data reading, comprising
a data reader used by an operator for obtaining identification information from an electronic label or tag on an item;
monitoring means for monitoring ergonomics of operating technique as the operator uses the data reader to read items;
feedback means in communication with the monitoring means for providing feedback of the ergonomics of the operating technique,
wherein the data reader is a device selected from the group consisting of: RFID reader, EAS deactivation device,
wherein the monitoring means comprises a weigh scale for gathering lifting data as the operator drags an item across the weigh scale and through a read volume.

10. A system according to claim 9 wherein the monitoring means comprises one or more cameras that detect motion of the item and means for analyzing the motion to determine how the item was moved through a read volume.

11. A system according to claim 10 wherein the means for analyzing determines whether the item was lifted, dragged or twisted as it was passed through the read volume.

12. A method of operating a data reader, comprising the steps of
having an operator move an item bearing an electronic tag through a detection volume;
monitoring movement of the item through the detection volume by repeatedly sensing for presence of the electronic tag and determining how long the electronic tag was present in the detection volume;
providing feedback of operating technique pertaining to how the operator moves the item through the detection volume.

13. A method according to claim 12 wherein the data reader comprises a device selected from the group consisting of: optical code reader, RFID reader, EAS deactivation device.

14. A method according to claim 12 further comprising
employing the electronic tags to determine when the item is in the detection volume and employing optical codes as identification tags for reading by the data reader.

15. A method according to claim 14 further comprising
employing non-deactivatable electronic article surveillance (EAS) tags as the electronic tags.

16. A method of operating a data reader, comprising the steps of
having an operator move an item bearing an electronic tag through a detection volume;
monitoring movement of the item through the detection volume by repeatedly sensing for presence of the electronic tag;
providing feedback of operating technique pertaining to how the operator moves the item through the detection volume,
wherein the step of monitoring movement of the item through the detection volume comprises
providing the item with a non-deactivatable EAS tag;
providing EAS sensors at entrance and exit of the detection volume;
sensing movement of the item into and out of the detection volume as the EAS sensors at the entrance and exit sense the EAS tag.

17. A data reader for reading identification tags on items, comprising
a portable housing adapted for handheld operation, the data reader having a read volume external to the housing, whereby the data reader reads identification tags on items in the read volume;
a velocity sensor or accelerometer mounted in or integrated into the housing for sensing motion of the data reader during operation;
means for providing feedback on operation of the data reader based upon the motion being sensed.

18. A data reader according to claim 17 wherein the data reader comprises a data reading device selected from the group consisting of: laser scanner, CCD imaging data reader, LED reader, CMOS imaging reader, RFID reader.

19. A data reader according to claim 17 wherein the means for providing feedback comprises a display on the housing.

20. A data reader according to claim 17 wherein the data reader includes a data reading device selected from the group consisting of: a barcode reader; an RFID tag reader.

21. A method of operating a data reader, comprising
manipulating an RFID reader so as to aim the RFID reader at an item bearing an RFID tag;
reading the RFID tag on the item;
determining distance between the RFID reader and the item corresponding to when the RFID tag was read;
comparing the determined distance to an optimum distance;
providing feedback on operation of the RFID reader based upon comparison of the determined distance to the optimum distance.

22. A method according to claim 21 wherein the step of providing feedback comprises
providing a display on a housing of the RFID reader and displaying a visual feedback on the display.

* * * * *